United States Patent [19]

Cook et al.

[11] Patent Number: 4,769,347

[45] Date of Patent: Sep. 6, 1988

[54] CONTRAST ENHANCEMENT FILTER GLASS FOR COLOR CRT DISPLAYS

[75] Inventors: Lee M. Cook, Duryea; Alexander J. Marker, III, Moscow, both of Pa.

[73] Assignee: Schott Glass Technologies, Inc., Duryea, Pa.

[21] Appl. No.: 816,652

[22] Filed: Jan. 6, 1986

[51] Int. Cl.$^4$ ............................................. C03C 3/095
[52] U.S. Cl. ......................................... 501/64; 313/480
[58] Field of Search .................... 501/64, 65, 66, 67, 501/69, 72; 313/480; 252/478

[56] References Cited

U.S. PATENT DOCUMENTS

| | | | |
|---|---|---|---|
| 4,288,250 | 9/1981 | Yamashita | 501/64 |
| 4,376,829 | 3/1983 | Daiku | 501/64 |
| 4,390,637 | 6/1983 | Daiku | 501/64 |
| 4,405,881 | 9/1983 | Kobayashi | 313/480 |
| 4,454,446 | 6/1984 | Kobayashi | 501/64 |
| 4,521,524 | 6/1985 | Yamashita | 501/64 |

FOREIGN PATENT DOCUMENTS

| | | | |
|---|---|---|---|
| 0127821 | 12/1984 | European Pat. Off. | 501/64 |
| 555061 | 5/1977 | U.S.S.R. | 501/64 |

*Primary Examiner*—Mark L. Bell
*Attorney, Agent, or Firm*—Millen & White

[57] ABSTRACT

A colored glass suitable for enhancing contrast of color CRT displays consists essentially of, in weight %:

| | |
|---|---|
| $SiO_2$ | 40–60% |
| $B_2O_3$ | 0–6% |
| $Al_2O_3$ | 0–2% |
| Sum $Li_2O$ + $Na_2O$ + $K_2O$ | 24–30% |
| Sum $MgO$ + $CaO$ + $SrO$ + $BaO$ + $ZnO$ | 0–10% |
| $TiO_2$ | 1–3% |
| $CeO_2$ | 1–3% |
| $Nd_2O_3$ | 10–25% |
| $Er_2O_3$ | 1–5% |
| $Sm_2O_3$ | 0–3% |
| Sum $Er_2O_3$ + $Sm_2O_3$ | 1–8% |
| $CuO$ | 0.1–0.5% |
| $MnO_2$ | 0.1–1.0%. |

17 Claims, No Drawings

CONTRAST ENHANCEMENT FILTER GLASS FOR COLOR CRT DISPLAYS

BACKGROUND OF THE INVENTION

For some time, CRT manufacturers have used filters to obtain contrast enhancement for full color displays. Useful filters transmit light of frequencies corresponding to the phosphor emission frequencies and absorb all other unwanted light. This substantially reduces glare in full sun applications when combined with a front surface AR coating. The most commonly used phosphors for color displays at present P43 and P22. Their primary emission bands are 544 nm (P43), and 445 and 620 nm (P22). Thus, the optimum contrast enhancement filter would have transmission windows of any desired level around these three wavelengths and would be opaque at all other wavelengths.

The first types of contrast enhancement filters utilized were composite filters consisting of two or more glass types such as, for example, a Schott neutral density filter type S-4020 together with a multiband Didymium filter, Schott S-8801. Composite filters often have transmission characteristics unobtainable in a single glass because of colorant incompatability.

The major disadvantage of a composite filter is the high cost of fabrication. This arises from the necessity to prepare a high optical finish on each of the filter surfaces and because the laminate must be bonded together with optical cements to eliminate Fresnel losses. Another significant disadvantage is the increased weight of a composite filter compared to a single glass filter. A typical prior art composite filter is disclosed in U.S. Pat. No. 4,245,242.

Because of the high fabrication cost of composites, single glasses which combine all required transmission characteristics (as much as possible) have been developed. Relevant prior-art glasses are disclosed in U.S. Pat. Nos. 4,521,524; 3,143,683; 4,520,115 (concerned with X-ray absorption); 4,405,881; and 4,390,637. The colorant combinations used to achieve contrast enhancement in the prior art generally involve:

(a) $Nd_2O_3 + Pr_2O_3$ in combination to give multiple narrow bandwidth transmission windows;

(b) $Fe_2O_3$ and CuO to absorb red frequencies outside the phosphor range;

(c) NiO and CoO to adjust overall transmittance in the visible range; and (d) other optional ingredients to fine-tune desired properties.

For example, components (d) have been added to absorb UV and near-UV light, e.g., Se (U.S. Pat. No. 3,143,683) or $CeO_2$ (U.S. Pat. No. 4,521,524).

These colorants are often incompatible and do not give the maximum contrast efficiency. Specifically, the combination of iron (required as $Fe^{2+}$) and copper (required as $Cu^{2+}$) is incompatible with respect to oxidation state. The former requires very reducing atmospheric conditions during manufacture, while the latter requires very oxidizing conditions. An additional serious problem is the use of both neodymium and praseodymium. Neodymium alone presents no problems. However, praseodymium has a strong absorption band at the major emission line (445 nm) of the P22 phosphor commonly used in color CRT displays. Its use is therefore contraindicated since its incorporation tends to degrade the contrast enhancement efficiency of filter used in such applications.

An additional complication of the colorants used in the prior art glasses, particularly for U.S. Pat. No. 4,521,524, is that the base composition most useful for stabilizing the colorants tends to have a high refractive index, typically greater than 1.57. This is undesirable. The front surface AR coatings used on these filters are most efficient if the refractive index of the base glass is less than 1.57.

The most desirable contrast enhancement filter, therefore, would be a single glass filter utilizing compatible colorant combinations which do not absorb undesirably at the phosphor wavelengths of interest and which has a refractive index Nd less than 1.57.

SUMMARY OF THE INVENTION

It is an object of this invention therefore to provide such a glass.

It is another object of this invention to provide such a filter based on the glass, especially in combination with a CRT.

Upon further study of the specification and appended claims, further objects and advantages of this invention will become apparent to those skilled in the art.

These objects are attained in the present invention by providing an optical quality glass consisting essentially of, in weight %:

|  | General | Preferred |
| --- | --- | --- |
| $SiO_2$ | 40-60% | 45-48% |
| $B_2O_3$ | 0-6% | 3-6% |
| $Al_2O_3$ | 0-2% | 0-1% |
| Sum $Li_2O + Na_2O + K_2O$ | 24-30% | 26-28% |
| Sum $MgO + CaO + SrO + BaO + ZnO$ | 0-10% | 3-5% |
| $TiO_2$ | 1-3% | 1-2% |
| $CeO_2$ | 1-3% | 1-2% |
| $Nd_2O_3$ | 10-25% | 10-15% |
| $Er_2O_3$ | 1-5% | 1-3% |
| $Sm_2O_3$ | 0-3% | 1-2% |
| Sum $Sm_2O_3 + Er_2O_3$ | 1-8% | 2-5% |
| CuO | 0.1-0.5% | 0.2-0.4% |
| $MnO_2$ | 0.1-1.0% | 0.5-0.8% |

DETAILED DISCUSSION

The ranges of glass constituents indicated above are determined by practical glass-making considerations and by their effects on transmission properties.

Silica levels of greater than 60 wt% cause melt viscosities and forming temperatures to become undesirably high. Below 40 wt%, chemical durability becomes undesirably low and the necessarily high levels of modifier cations can lead to phase separation or devitrification.

While boric oxide is not necessary to the present invention, its incorporation is desirable in glasses having $SiO_2$ levels within the higher portion of the range in order to reduce melt viscosity to desirable levels. If $B_2O_3$ content is raised above 6 wt%, chemical durability decreases and the glass becomes more prone to phase separation.

Aluminum oxide is added to enhance chemical durability. If $Al_2O_3$ content is above 2 wt%, there are undesirable increases in melt viscosity.

Alkali is added to control melt viscosity and to stabilize high concentrations of lanthanide ions. If alkali content is below 24 wt%, melt viscosity becomes undesirably high and glass become more prone to phase separation. At alkali levels above 30 wt% chemical durability becomes undesirably low, and/or needed amounts of other oxides cannot be incorporated.

Alkaline earths and zinc are added to improve chemical durability. At levels above 10 wt% glasses become prone to devitrification and phase separation.

$TiO_2$ and $CeO_2$ are added to supress near-UV and X-ray transmission. They are each ineffective at levels below 1 wt%. At levels above 3 wt% they tend to increase refractive index above desired levels as discussed above. An equimolar combination of $TiO_2$ and $CeO_2$ is the most desirable combination.

$Nd_2O_3$ is the primary coloring ion in the present invention. Its purpose is to give intense multiband absorption which acts to separate the spectral regions of interest. Levels below 10 wt% do not give adequate absorption intensity. Levels above 25 wt% are difficult to incorporate without phase separation or devitrification. Additionally, at levels above 25 wt%, transmission at the 545 nm phosphor wavelength becomes undesirably low.

$Er_2O_3$ and $Sm_2O_3$ are added to give better absorption between the desired transmission bands. While samarium is not necessary to the present invention, it is most desirable to use at least 1 wt% as it has a relatively low absorption intensity. At above 3 wt%, manufacturing costs become undesirably high. One of the specific functions of $Er_2O_3$ is to absorb at 520 nm to mask an undesired transmission peak in the $Nd_2O_3$ spectrum. Levels below 1 wt% do not give required absorption intensity. At above 5 wt%, manufacturing costs become undesirably high. The most desirable combination of absorption characteristics is given by using a combination of $Sm_2O_3+Er_2O_3$ in the range 1-8 wt%. This, together with the range of $Nd_2O_3$ given above, is critical to the present invention, as it provides significantly better contrast efficiency than prior art glasses.

Copper oxide is added to absorb wavelengths above ~650 nm because of the absorption of $Cu^{2+}$. Levels of CuO below 0.1 wt% do not give requisite absorption in this region. Levels above 0.5 wt% reduce the transmission at the 618 nm phosphor emission wavelength to undesirably low values.

Manganese oxide is added to absorb unwanted frequencies in the range 470-500 nm, which is the range of maximum absorption for $Mn^{2+}$. Levels of <0.1 wt% do not provide needed absorption intensity when combined with the other colorants above. At levels above 1.0 wt%, transmission at the 445 and 545 nm phosphor emission wavelengths becomes undesirably low.

Although the above-discussed composition is fully capable of satisfying the requirements placed on state of the art color CRT filter glasses, it is also possible to include other conventional colorants for their conventional purposes in affecting the transmission/reflectance properties of such glasses, e.g., as discussed in the references cited above, e.g., in USP 4,521,524. Typically, such colorants are included in a total amount of about 0.01-5 weight percent. Such conventional colorants include $Fe_2O_3$, CoO, NiO, $ZrO_2$, $La_2O_3$, $Cr_2O_3$, etc. However, none of these ingredients is essential for achievement of the results of this invention; none is preferred.

As mentioned above, a major feature of the glasses of this invention is the achievement of the requisite transmission properties in conjunction with a glass having an index of refraction less than about 1.57, higher values being acceptable but not preferred. While the lower value achieved is not particularly critical, it is preferred, of course, that the index be above a value wherein design of efficient antireflection coatings becomes more difficult.

Certain glasses of this invention include:

| | | |
|---|---|---|
| (a) | $SiO_2$ | 45-47 |
| | $B_2O_3$ | 4-6 |
| | $Al_2O_3$ | 0.5-1.5 |
| | $Na_2O$ | 13-15 |
| | $K_2O$ | 11-13 |
| | BaO | 2-4 |
| | $Nd_2O_3$ | 10-12 |
| | $Er_2O_3$ | 1-3 |
| | $Sm_2O_3$ | 1-3 |
| | $TiO_2$ | 1.5-2.5 |
| | $CeO_2$ | 1.5-2.5 |
| | $MnO_2$ | 0.5-0.8 |
| | CuO | 0.25-0.31 |
| (b) | $SiO_2$ | 45-46 |
| | $B_2O_3$ | about 5 |
| | $Al_2O_3$ | about 1 |
| | $Na_2O$ | 14-15 |
| | $K_2O$ | 12.1-12.5 |
| | BaO | 3-4 |
| | $Nd_2O_3$ | about 11 |
| | $Er_2O_3$ | about 2 |
| | $Sm_2O_3$ | 0-2 |
| | $TiO_2$ | 1.4-2.1 |
| | $CeO_2$ | 1.4-2.1 |
| | $MnO_2$ | about 0.65 |
| | CuO | 0.25-0.28 |
| (c) | $SiO_2$ | 40-60% |
| | $B_2O_3$ | 0-6% |
| | $Al_2O_3$ | 0-2% |
| | Sum $Li_2O + Na_2O + K_2O$ | 24-30% |
| | Sum MgO + CaO + SrO + BaO + ZnO | 0-10% |
| | $TiO_2$ | 1-3% |
| | $CeO_2$ | 1-3% |
| | $Nd_2O_3$ | 10-25% |
| | $Er_2O_3$ | 1-5% |
| | $Sm_2O_3$ | 0-3% |
| | Sum $Sm_2O_3 + Er_2O_3$ | 1-8% |
| | CuO | 0.1-0.5% |
| | $MnO_2$ | 0.1-1.0%; | and an effective amount of a colorant oxide.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

EXAMPLES 1-4

The examples disclosed below were melted from conventional glass-making oxide and carbonate raw materials in induction-heated platinum crucibles. The mixed batch was typically melted at around 1300 degrees C., refined for 2 hours at 1500 degrees C., and cast at around 1400 degrees C. Glasses were held for 2 hours at their individual transition temperatures (Tg) as given in the table below and annealed at 30 degrees C/hr. to provide stress-free glass.

| WT % ELEMENT | 1 | 2 | 3 | 4 (preferred) | 5 | 6 | 7 |
|---|---|---|---|---|---|---|---|
| $SiO_2$ | 45.90 | 45.90 | 44.90 | 44.88 | 44.87 | 44.82 | 41.84 |
| $B_2O_3$ | 4.99 | 4.99 | 4.99 | 4.99 | 3.99 | 3.98 | 3.98 |
| $Al_2O_3$ | 1.00 | 1.00 | 1.00 | 1.00 | 1.00 | 1.00 | 1.00 |
| $Na_2O$ | 14.97 | 14.97 | 13.97 | 13.97 | 11.96 | 11.95 | 11.95 |
| $K_2O$ | 12.48 | 12.08 | 12.08 | 12.07 | 12.06 | 12.05 | 12.05 |
| BaO | 3.99 | 3.99 | 3.99 | 2.99 | 2.99 | 2.99 | 2.99 |
| $Nd_2O_3$ | 10.98 | 10.98 | 10.98 | 10.98 | 14.95 | 14.94 | 17.93 |
| $Er_2O_3$ | 2.00 | 2.00 | 2.00 | 2.00 | 1.99 | 1.99 | 1.99 |
| $Sm_2O_3$ | — | — | 2.00 | 2.00 | 1.99 | 1.99 | 1.99 |
| $TiO_2$ | 1.40 | 1.60 | 1.60 | 2.10 | 1.69 | 1.69 | 1.69 |
| $CeO_2$ | 1.40 | 1.60 | 1.60 | 2.10 | 1.69 | 1.69 | 1.69 |
| $MnO_2$ | 0.64 | 0.64 | 0.64 | 0.64 | 0.59 | 0.66 | 0.65 |
| CuO | 0.25 | 0.25 | 0.25 | 0.28 | 0.23 | 0.25 | 0.25 |
| $Sm_2O_3$ |  |  | 2.0 | 2.0 | 2.0 | 2.0 | 2.0 |
| $TiO_2$ | 1.4 | 1.6 | 1.6 | 2.1 | 1.7 | 1.7 | 1.7 |
| $CeO_2$ | 1.4 | 1.6 | 1.6 | 2.1 | 1.7 | 1.7 | 1.7 |
| $MnO_2$ | 0.4 | 0.4 | 0.4 | 0.4 | 0.37 | 0.41 | 0.41 |
| CuO | .25 | .25 | .25 | .28 | 0.23 | 0.25 | 0.25 |
| Nd | 1.56354 |  |  | 1.56564 | 1.56871 | 1.56856 | 1.57942 |
| Density ($G/cm^3$) |  | 2.92 | 2.91 | 2.97 | 2.96 | 3.1 |  |
| C.T.E. ($\times 10-7$) |  | 132 | 131 | 127 | 127 | 125 |  |
| TG (C) |  | 460 | 463 | 485 | 486 | 490 |  |
| % at W.L. (3.5 mm) |  |  |  |  |  |  |  |
| 445 nm | 32.1 | 30.2 | 29.6 | 26.0 | 39.0 | 29.8 | 24.4 |
| 555 nm | 30.6 | 29.8 | 31.4 | 28.9 | 44.5 | 33.0 | 27.4 |
| 618 nm | 31.4 | 30.9 | 34.9 | 30.2 | 48.0 | 34.9 | 31.1 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass consisting essentially of, in weight %:

| | |
|---|---|
| $SiO_2$ | 40–60% |
| $B_2O_3$ | 0–6% |
| $Al_2O_3$ | 0–2% |
| Sum $Li_2O + Na_2O + K_2O$ | 24–30% |
| Sum $MgO + CaO + SrO + BaO + ZnO$ | 0–10% |
| $TiO_2$ | 1–3% |
| $CeO_2$ | 1–3% |
| $Nd_2O_3$ | 10–25% |
| $Er_2O_3$ | 1–5% |
| $Sm_2O_3$ | 0–3% |
| Sum $Sm_2O_3 + Er_2O_3$ | 1–8% |
| CuO | 0.1–0.5% |
| $MnO_2$ | 0.1–0.8%. |

2. A glass of claim 1 consisting essentially of, in weight %:

| | |
|---|---|
| $SiO_2$ | 45–48% |
| $B_2O_3$ | 3–6% |
| $Al_2O_3$ | 0–1% |
| Sum $Li_2O + Na_2O + K_2O$ | 26–28% |
| Sum $MgO + CaO + SrO + BaO + ZnO$ | 3–5% |
| $TiO_2$ | 1–2% |
| $CeO_2$ | 1–2% |
| $Nd_2O_3$ | 10–15% |
| $Er_2O_3$ | 1–3% |
| $Sm_2O_3$ | 1–2% |
| Sum $Sm_2O_3 + Er_2O_3$ | 2–5% |
| CuO | 0.2–0.4% |
| $MnO_2$ | 0.5–0.8% |

3. A glass of claim 1 consisting essentially of said oxides of Si, B, Al, Na, K, Ba, Nd, Er, Ti, Ce, Mn, and Cu, in said amounts.

4. A glass of claim 1 consisting essentially of said oxides of Si, B, Al, Na, K, Ba, Nd, Er, Ti, Ce, Mn, Cu and Sm, is in said amounts.

5. A glass of claim 2 consisting essentially of said oxides of Si, B, Al, Na, K, Ba, Nd, Er, Ti, Ce, Mn, and Cu, in said amounts.

6. A glass of claim 1 consisting of said oxides of Si, B, Al, Na, K, Ba, Nd, Er, Ti, Ce, Mn, Cu and Sm, in said amounts.

7. A glass of claim 1 wherein the amounts of Ti and Ce are substantially equimolar.

8. A glass of claim 2 wherein the amounts of Ti and Ce are substantially equimolar.

9. A glass of claim 1 consisting essentially of:

| | |
|---|---|
| $SiO_2$ | 45–47 |
| $B_2O_3$ | 4–6 |
| $Al_2O_3$ | 0.5–1.5 |
| $Na_2O$ | 13–15 |
| $K_2O$ | 11–13 |
| BaO | 2–4 |
| $Nd_2O_3$ | 10–12 |
| $Er_2O_3$ | 1–3 |
| $Sm_2O_3$ | 1–3 |
| $TiO_2$ | 1.5–2.5 |
| $CeO_2$ | 1.5–2.5 |
| $MnO_2$ | 0.5–0.8 |
| CuO | 0.25–0.31 |

10. A glass of claim 1 consisting essentially of:

| | |
|---|---|
| $SiO_2$ | 45–46 |
| $B_2O_3$ | about 5 |

| | |
|---|---|
| $Al_2O_3$ | about 1 |
| $Na_2O$ | 14–15 |
| $K_2O$ | 12.1–12.5 |
| BaO | 3–4 |
| $Nd_2O_3$ | about 11 |
| $Er_2O_3$ | about 2 |
| $Sm_2O_3$ | 0–2 |
| $TiO_2$ | 1.4–2.1 |
| $CeO_2$ | 1.4–2.1 |
| $MnO_2$ | about 0.65 |
| CuO | 0.25–0.28 |

11. A glass consisting essentially of, in weight %:

| | |
|---|---|
| $SiO_2$ | 40–60% |
| $B_2O_3$ | 0–6% |
| $Al_2O_3$ | 0–2% |
| Sum $Li_2O + Na_2O + K_2O$ | 24–30% |
| Sum $MgO + CaO + SrO + BaO + ZnO$ | 0–10% |
| $TiO_2$ | 1–3% |
| $CeO_2$ | 1–3% |
| $Nd_2O_3$ | 10–25% |
| $Er_2O_3$ | 1–5% |
| $Sm_2O_3$ | 0–3% |
| Sum $Sm_2O_3 + Er_2O_3$ | 1–8% |
| CuO | 0.1–0.5% |
| $MnO_2$ | 0.1–0.8% | and an effective amount of a colorant oxide.

12. In a color CRT comprising a color CRT and a filter glass, the improvement wherein the filter glass is one of claim 1.

13. In a color CRT comprising a color CRT and a filter glass, the improvement wherein the filter glass is one of claim 2.

14. In a color CRT comprising a color CRT and a filter glass, the improvement wherein the filter glass is one of claim 3.

15. In a color CRT comprising a color CRT and a filter glass, the improvement wherein the filter glass is one of claim 9.

16. A glass of claim 1 wherein the amount of $Sm_2O_3$ is 1–3 wt%.

17. A glass of claim 1 wherein the amount of $Er_2O_3$ is 1–3 wt% and the amount of $Sm_2O_3$ is 1–2 wt%.